(12) United States Patent
Devic et al.

(10) Patent No.: US 9,064,314 B2
(45) Date of Patent: Jun. 23, 2015

(54) ROBUST AUTOMATIC DETERMINATION AND LOCATION OF MACBETH COLOR CHECKER CHARTS

(71) Applicant: Nvidia Corporation, Santa Clara, CA (US)

(72) Inventors: Goran Devic, Austin, TX (US); Shalini Gupta, Austin, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 176 days.

(21) Appl. No.: 13/849,817

(22) Filed: Mar. 25, 2013

(65) Prior Publication Data

US 2014/0286569 A1 Sep. 25, 2014

(51) Int. Cl.
- *G06K 9/00* (2006.01)
- *G06T 5/00* (2006.01)
- *G06T 7/00* (2006.01)
- *G06T 7/40* (2006.01)

(52) U.S. Cl.
CPC .............. *G06T 5/007* (2013.01); *G06T 7/0042* (2013.01); *G06T 7/408* (2013.01)

(58) Field of Classification Search
USPC ............ 382/162, 165, 167, 181, 190; 358/1.9
See application file for complete search history.

(56) References Cited

U.S. PATENT DOCUMENTS 8,073,248 B2 * 12/2011 Brunner et al. ............... 382/165
8,189,887 B2 * 5/2012 Kollias et al. ................. 382/128
8,208,758 B2 * 6/2012 Wang et al. ................... 382/282
8,279,300 B2 * 10/2012 Origuchi ..................... 348/222.1
8,872,923 B2 * 10/2014 Gottwals et al. ............. 348/188
2013/0011062 A1 * 1/2013 Conwell et al. ............... 382/173

OTHER PUBLICATIONS

Joshi, N., et al. Automatic Color Calibration for Large Camera Arrays, Department of Computer Science and Engineering, University of California, San Diego, 2005, 4 pgs.
Liu, M., et al. "A New Quality Assessment and Improvement System for Print Media." EURASIP Journal on Advances in Signal Processing 2012, pp. 1-17.
Tajbakhsh, T., et al., "Semiautomatic Color Checker Detection in Distorted Images." Proceedings of the Fifth IASTED International Conference on Signal Processing, Pattern Recognition and Applications. ACTA Press, 2008, pp. 347-352.
"DxO Analyzer—The Complete Image Quality Evaluation Solution," DxO Labs, http://www.dxo.com/intl/image_quality/dxo_analyzer, © 2003-2013, 2 pgs.

(Continued)

*Primary Examiner* — Yon Couso

(57) ABSTRACT

A MacBeth color checker chart automatic detection system includes an imaging unit that provides an image and a processing unit that applies an edge detection operation to the image and performs a flood-fill operation on the image to provide a flood-filled image. Additionally, the MacBeth color checker chart automatic detection system includes a testing unit that tests the flood-filled image to provide a modified flood-fill image, wherein a set of heuristic tests are employed to automatically determine quantity and location of MacBeth color checker charts. Generally, the set of heuristic tests are employed to automatically reject regions that are unlikely to belong to a MacBeth color checker chart and to cluster the remaining regions that are likely to belong to a Macbeth color checker chart. A MacBeth color checker chart automatic detection method is also provided.

20 Claims, 4 Drawing Sheets

(56) References Cited

OTHER PUBLICATIONS

"Color Management Products for Photography", X-Rite Photo Solutions, Inc.,http://xritephoto.com/ph_product_overview_aspx?id=1257&catid=28&action=overview, © 2013 X-Rite Inc., 2 pgs.

Hirakawa, K., "ColorChecker Finder," accessed from http://campus.udayton.edu/~ISSL/software, © University of Dayton ECE ISSL, 3 pgs., 2013.

"Imatest—Using Colorcheck", X-Rite, Inc., http://www.imatest.com/docs/colorcheck, 12 pgs., Apr. 22, 2013.

"Color Management Products for Photography", X-Rite Photo Solutions, Inc.,http://xritephoto.com/ph_product_overview_aspx?id=1257&catid=28&action=overview, © 2013 X-Rite Inc., 2 pgs., Apr. 22, 2013.

* cited by examiner

ROBUST AUTOMATIC DETERMINATION AND LOCATION OF MACBETH COLOR CHECKER CHARTS

TECHNICAL FIELD

This application is directed, in general, to color chart detection and, more specifically, to a system and method of automatic MacBeth color checker chart detection.

BACKGROUND

Automatic detection and localization of colored checker charts is imperative for automatic image quality assessment and calibration. It is also essential for batch processing of large sets of images, which can become very tedious and inefficient with manual or semi-automatic chart detection. Automatic chart detection can also be used to automatically disable special calibration software in generic image capture or printing tools (e.g., cameras, scanners, or printers) where the majority of the images may not have a chart. Most existing approaches employ either completely manual or semi-automatic methods, which ultimately require human users to mark or correct the locations of charts. Improvements in this area would prove beneficial to the art.

SUMMARY

Embodiments of the present disclosure provide a MacBeth color checker chart automatic detection system and a MacBeth color checker chart automatic detection method.

In one embodiment, the MacBeth color checker chart automatic detection system includes an imaging unit that provides an image and a processing unit that applies an edge detection operation to the image and performs a flood-fill operation on the image to provide a flood-filled image. Additionally, the MacBeth color checker chart automatic detection system includes a testing unit that tests the flood-filled image to provide a modified flood-fill image, wherein a set of heuristic tests are employed to automatically determine quantity and location of MacBeth color checker charts.

In another aspect, the MacBeth color checker chart automatic detection method includes providing an image, applying an edge detection operation to the image and performing a flood-fill operation on the image to provide a flood-filled image. The method also includes testing the flood-filled image to provide a modified flood-fill image, wherein a set of heuristic tests are employed to automatically determine quantity and location of MacBeth color checker charts.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which.

DETAILED DESCRIPTION

Current detection of color checker charts does not support the detection of more than one color checker chart and is typically a very slow process. In some detection schemes, a standard calibration grid is detected first and the color checker chart is then affixed at a predefined location on the calibration grid chart before another image is captured. A position of the color checker chart in the image is then inferred from the pre-computed position of the calibration grid. Additionally, a single chart at only zero, 90, 180, 270 degrees of rotation may be detected. Further, an exact scanning resolution of the image often needs to be known. Also required, is a no or low perspective distortion of the chart.

Embodiments of the present disclosure provide the ability to automatically detect the presence (or absence) of one or more MacBeth color checker charts in digital images as well as a corresponding location of each. The MacBeth color checker chart, which may also be known as a Color Checker or a Color Rendition Chart, may be located at any position within the image. It may be of any size (above a certain minimum) and at any chart orientation (e.g., portrait, landscape or in between). It may also have an arbitrary edge view perspective distortion (above a certain minimum). Therefore, embodiments of the present disclosure are much more robust with respect to chart scale, rotation, and perspective distortions.

Figure 1A:
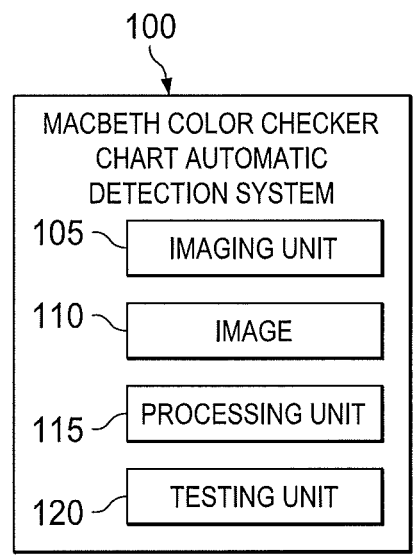
FIG. 1A illustrates a block diagram of a MacBeth color checker chart automatic detection system constructed according to the principles of the present disclosure.

FIG. 1A illustrates a block diagram of a MacBeth color checker chart automatic detection system, generally designated 100, constructed according to the principles of the present disclosure. The MacBeth color checker chart automatic detection system 100 includes an imaging unit 105, an image 110 (usually a digital image), a processing unit 115 and a testing unit 120. Generally, the image 110 provided by the imaging unit 105, may or may not contain one or more MacBeth color checker charts.

The processing unit 115 applies an edge detection operation to the image 110 and performs a flood-fill operation on the image 110 to provide a flood-filled image. The testing unit 120 tests the flood-filled image to provide a modified flood-fill image, wherein a set of heuristic tests are employed to automatically determine quantity and location of all MacBeth color checker charts within the image 110. Of course, the quantity may be zero indicating an absence of any MacBeth color checker charts within the image 110. When one or more MacBeth color checker charts are present, their individual locations are detected and reported.

Figure 1B:
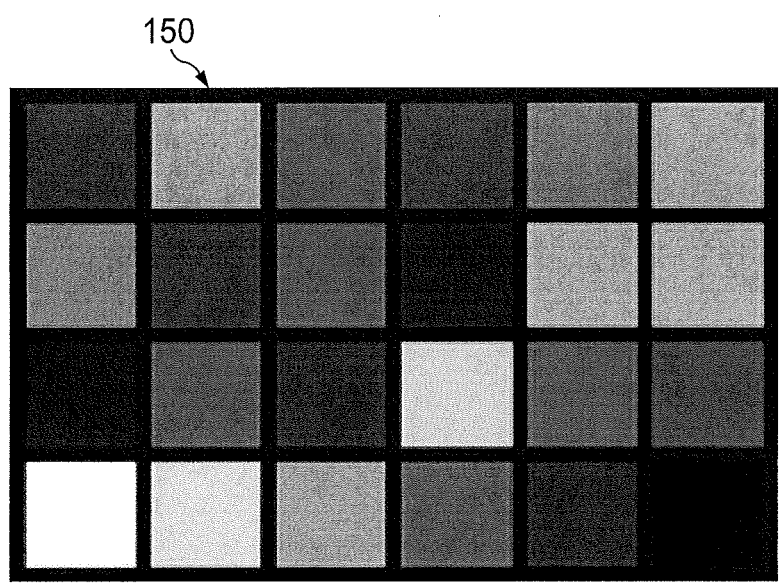
FIG. 1B illustrates a view of a MacBeth color checker chart, as may be employed in the image of FIG. 1A.

FIG. 1B illustrates a view of a MacBeth color checker chart 150, as may be employed in the image 110 of FIG. 1A and following images of discussion. The MacBeth color checker chart 150 is a checkerboard array of 24 scientifically prepared color squares employing a wide range of colors. These colored squares represent objects of special interest such as foliage, human skin and blue sky, for example. These squares represent the same color as their counterparts, and also reflect light the same way in all parts of the visible spectrum. Correspondingly, the squares match the colors of natural objects under any illumination and with any color reproduction process.

Figure 2:
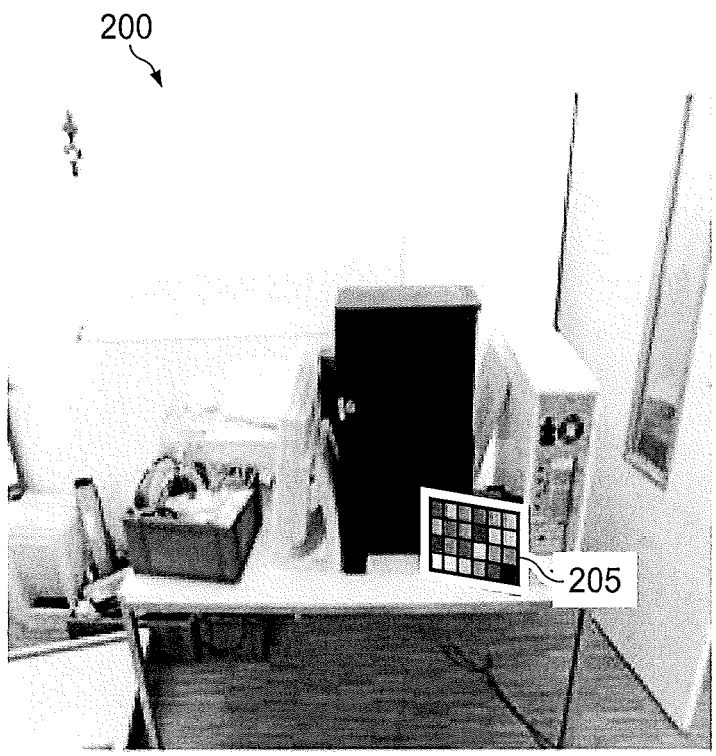
FIG. 2 illustrates an image of a test bed example of a MacBeth color checker chart.

FIG. 2 illustrates an image of a test bed example, generally designated 200, employing a MacBeth color checker chart 205. The image of the test bed example 200 is representative of a collection of dissimilar objects wherein one of the objects is the MacBeth color checker chart 205 that has been included at an acceptable perspective for an imaging unit thereby providing the image of the test bed example 200. In the following FIGS. 3, 4 and 5, examples of edge detection and flood-fill operations as well as testing employing a set of heuristic tests are performed on the image of the test bed example 200 to provide automatic detection of the MacBeth color checker chart 205.

Figure 3:
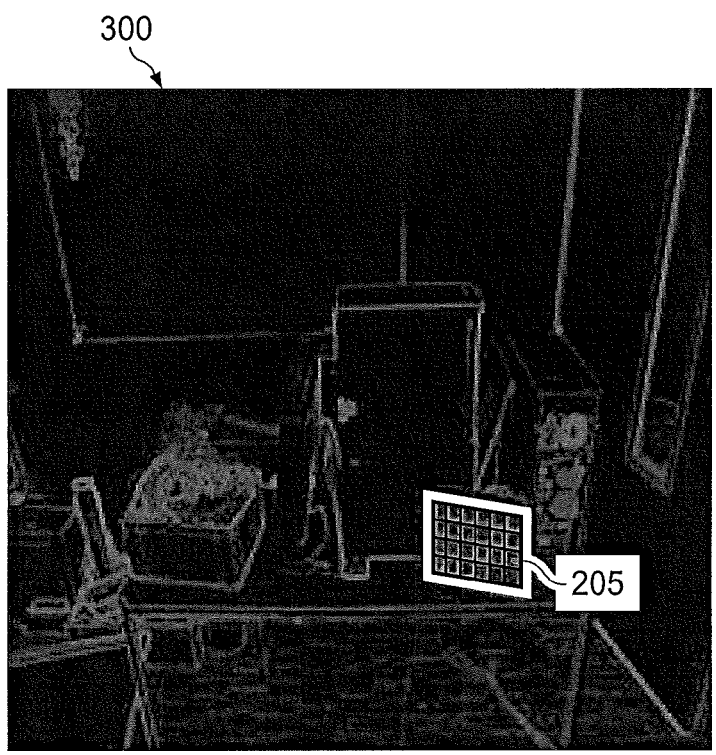
FIG. 3 illustrates an edge-detection operation example performed on the image of the test bed example of FIG. 2.

FIG. 3 illustrates an edge-detection operation example, generally designated 300, performed on the image of the test bed example 200 of FIG. 2. The edge-detection operation 300 provides a fundamental tool in image processing and employs a set of mathematical techniques that may be used to identify points in a digital image having sharp changes (i.e., discontinuities) in image brightness.

The edge-detection operation 300 begins with the detection of edges in each of the individual red, green and blue (RGB) color planes of the image 200 (i.e., the image of the test bed example 200). Any standard edge-detection algorithm may be used. In the illustrated example, a simple (and fast) two-dimensional (2D) edge detector having an adjustable threshold was employed. The image 200 is modified in place, and color values representing local differences (after edge detection) in color values between pixels and their adjacent neighbors are shown in FIG. 3, wherein the MacBeth color checker chart 205 is detected.

Figure 4:
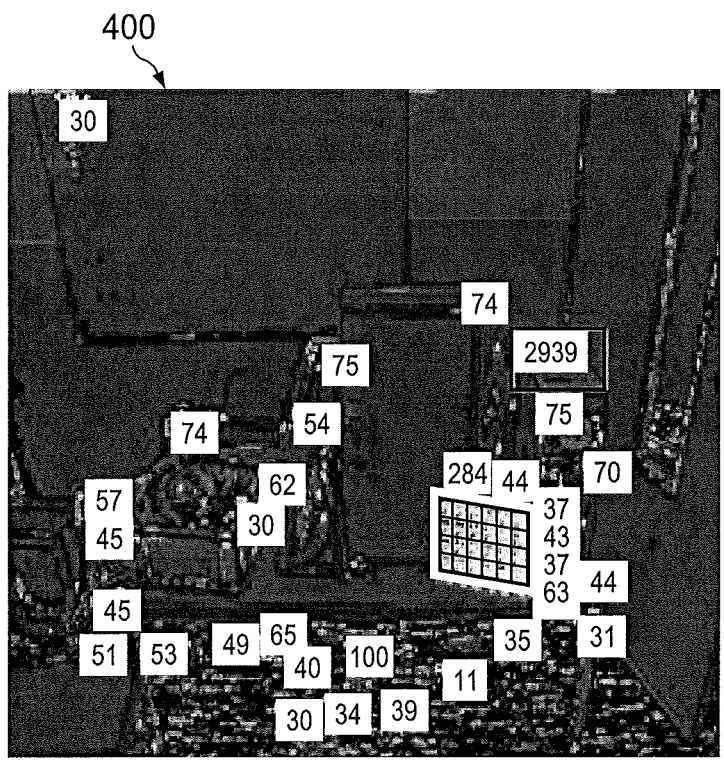
FIG. 4 illustrates a modified flood-fill operation example corresponding to the image of FIG. 2.

FIG. 4 illustrates a modified flood-fill operation example, generally designated 400, corresponding to FIG. 2. The modified flood-fill operation 400 shows the image 200 after the modified flood-fill operation has completed. The areas bounded by rectangles are areas likely to contain MacBeth color patches (ideally squares) in the data structure resulting from the modified flood-fill. Numbers next to each of the rectangles represent their corresponding areas designated in number of pixels.

This second processing operation on the image 200 is typically a fast image operation, since it is linear with the number of pixels affected, and hence may be suitable for use in real-time systems. Embodiments of the present disclosure employ the modified flood-fill operation to automatically detect charts, wherein its operation yields desirable data structures that further facilitate the process of automatic MacBeth color checker chart detection and location.

After the edge detection operation of FIG. 3, the resulting edge-detected image can be described as a spatial set of separate partition areas having null-colored pixels (i.e., R=0, G=0, B=0). The partition areas are separated by edges of colored pixels. The flood fill operation is then employed to "fill" or label the individual partition areas. Then, a set of heuristic tests are employed that typically allow a rejection of a large number of the partition areas and create a final data structure, which ideally contains only the color patches of the MacBeth color checker chart 205.

The set of heuristic tests employed include the following tests. A first heuristic test includes accepting a partition area in the flood-filled image that exceeds a minimum number of pixels. Correspondingly, if a total number of pixels in a given area is determined to be less than or equal to the minimum number of pixels, that area is rejected, since it is not likely to be a color patch of the a MacBeth color checker chart. The minimum value may be empirically determined based on a particular implementation. In the illustrated example, a value of 30 pixels provides good results. Generally, this first heuristic test rejects partition areas that are too small.

A second heuristic test includes accepting a partition area in the flood-filled image that has a bounding shape (e.g., a bounding box or rectangular shape) with a length to width ratio (i.e., an aspect ratio) that is less than a selected maximum value. In some embodiments, this length to width ratio may be an average length to average width ratio for non-rectangular shapes. Correspondingly, if the aspect ratio of the bounding box is greater than or equal to the selected maximum value, that partition area is rejected. The maximum value may be empirically determined. In the illustrated example, a value of five was determined to be sufficient. Generally, this second heuristic test rejects areas that are too slim or elongated and are less likely to be reasonable representations of a color patch of a MacBeth color checker chart.

A third heuristic test includes accepting a partition area in the flood-filled image if the color of a selected number pixels therein is determined to be consistent with a reference color. Generally, the reference color may be any color. However, in particular, a reference color that corresponds to one of the color patches of the MacBeth color checker chart may prove advantageous.

Correspondingly, if the color of the selected number of pixels therein is determined to be inconsistent with (i.e., differs by a selected maximum value from) the reference color, that partition area is rejected. The selected maximum value may be determined empirically. In the illustrated example, a maximum value of about 15 was determined to be sufficient. Generally, this third heuristic test reflects one of the basic properties of the MacBeth color checker chart, which is color consistency within each color patch, and therefore, rejects partition areas that are not sufficiently consistent in color.

A fourth heuristic test includes accepting a partition area in the flood-filled image that has a ratio of its area to the number of pixels contained therein that exceeds a selected minimum ratio. Correspondingly, if a resulting percentage is less than the selected minimum ratio, that partition area is rejected. The selected minimum value may be determined empirically and for the illustrated example, a value of about 50 percent was sufficient. Generally, this fourth heuristic test reflects one of the basic properties of a MacBeth color checker chart in that its colored patches have a regular shape. This test provides a good method to reject areas that are irregularly shaped as they statistically contain fewer pixels for a given bounding rectangle.

Figure 5:
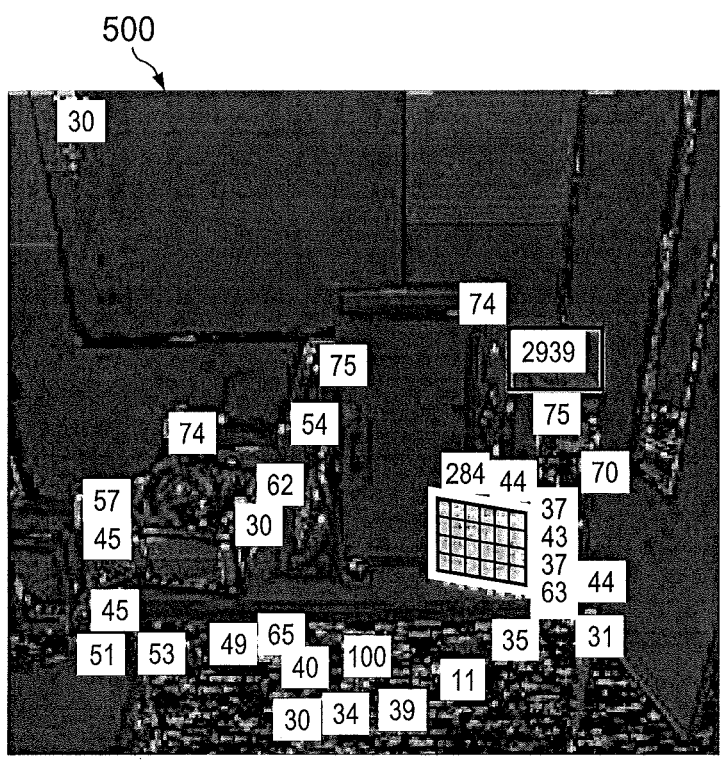
FIG. 5 illustrates a clustering algorithm example corresponding to the image of FIG. 2.

After completion of this modified flood-fill operation, remaining partition areas are likely to contain color patches of the MacBeth color checker chart. Then, each remaining partition area is represented by its centroid, which is the coordinate of the center of its bounding box. FIG. 5 provides a next operation that operates on this data set.

FIG. 5 illustrates a clustering algorithm example, generally designated 500, corresponding to the image 200 of FIG. 2. A continued testing process traverses each centroid and forms clusters of color patches that are spatially proximate, and have similar aspect ratios and areas (in terms of the number of pixels). A difference in area between color patches is compared to a maximum value and a color patch is rejected from being in a cluster if it is larger than the maximum value by a predetermined amount. The maximum value may typically be determined empirically, and a difference of about 20 percent is sufficient, in the illustrated example.

Since one of the basic properties of a MacBeth color checker chart is that its colored patches are equal in size, this aspect of testing groups areas that are similar in size into clusters. It may be noted that their size can still differ slightly due to perspective distortions. At the end of this testing there are zero or more clusters. Each cluster contains centroids associated with color patches of separate MacBeth color checker charts. The testing process guarantees that there are no overlaps (i.e., no false positives of more than one MacBeth color checker chart overlapping another). The centroids of each cluster can now be easily converted automatically to individual MacBeth color checker chart coordinates.

Figure 6:
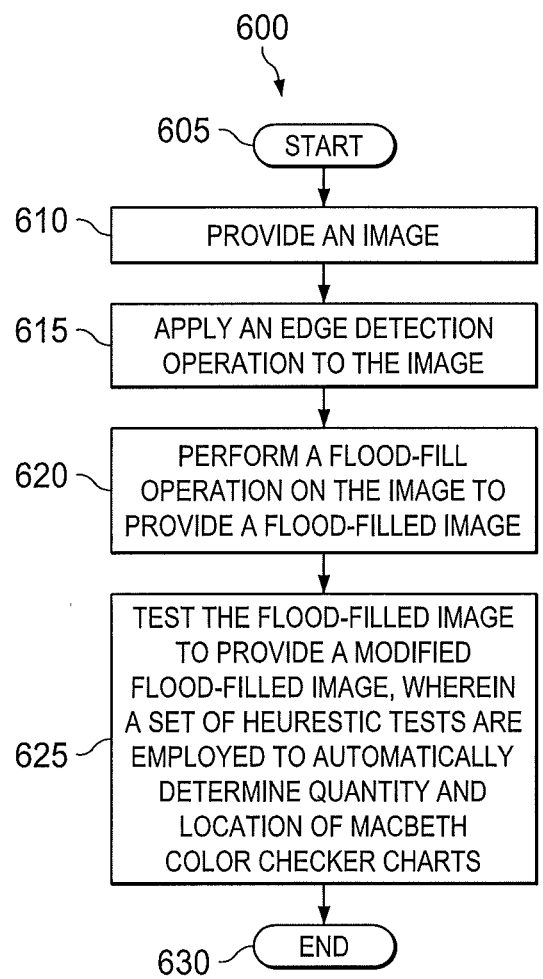
FIG. 6 illustrates a flow diagram of an embodiment of a MacBeth color checker chart automatic detection method carried out according to the principles of the present disclosure.

FIG. 6 illustrates a flow diagram of an embodiment of a MacBeth color checker chart automatic detection method, generally designated 600, carried out according to the principles of the present disclosure. The method 600 starts in a step 605, and an image is provided in a step 610. Then, an edge detection operation is applied to the image, in a step 615, and a flood-fill operation is performed on the image to provide a flood-filled image, in a step 620. The flood-filled image is tested to provide a modified flood-fill image, wherein a set of heuristic tests are employed to automatically determine quantity and location of MacBeth color checker charts, in a step 625.

In one embodiment, the edge detection operation individually identifies edges in each of the red, green and blue color planes of the image. In another embodiment, a resulting edge-detected image corresponds to a spatial set of separate partition areas having no colored pixels. Correspondingly, the flood-fill operation fills partition areas that are surrounded by edges of colored pixels.

In yet another embodiment, the set of heuristic tests includes accepting a partition area in the flood-filled image that exceeds a minimum number of pixels. In still another embodiment, the set of heuristic tests includes accepting a partition area in the flood-filled image having a bounding shape with a length to width ratio that is less than a maximum value.

In a further embodiment, the set of heuristic tests includes accepting a partition area in the flood-filled image if a color of a selected number pixels therein is determined to be consistent with a reference color. Additionally, the reference color may correspond to the colors of the MacBeth color chart. In a yet further embodiment the set of heuristic tests includes accepting a partition area in the flood-filled image having a ratio of its partition area to the number of pixels contained therein that exceeds a selected minimum ratio. In a still further embodiment, the set of heuristic tests includes accepting partition areas in the flood-filled image that are clustered together and have substantially equal aspect ratios containing about a same number of pixels. The method 600 ends in a step 630.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A MacBeth color checker chart automatic detection system, comprising:
   a processing computer processor that applies an edge detection operation to an image provided by an imaging unit and performs a flood-fill operation on the image to provide a flood-filled image; and
   a testing computer processor that tests the flood-filled image to provide a modified flood-fill image, wherein a set of heuristic tests are employed to automatically determine quantity and location of MacBeth color checker charts.

2. The system as recited in claim 1 wherein the edge detection operation individually identifies edges in each of red, green and blue color planes of the image.

3. The system as recited in claim 2 wherein a resulting edge-detected image corresponds to a spatial set of separate partition areas having null-colored pixels.

4. The system as recited in claim 1 wherein the flood-fill operation fills partition areas that are surrounded by edges of colored pixels.

5. The system as recited in claim 1 wherein the set of heuristic tests includes accepting a partition area in the flood-filled image that exceeds a minimum number of pixels.

6. The system as recited in claim 1 wherein the set of heuristic tests includes accepting a partition area in the flood-filled image that has a bounding shape with a length to width ratio that is less than a selected maximum value.

7. The system as recited in claim 1 wherein the set of heuristic tests includes accepting a partition area in the flood-filled image if a color of a selected number of pixels therein is determined to be consistent with a reference color.

8. The system as recited in claim 7 wherein the reference color corresponds to one of the colors of the MacBeth color checker chart.

9. The system as recited in claim 1 wherein the set of heuristic tests includes accepting a partition area in the flood-filled image that has a ratio of its partition area to the number of pixels contained therein that exceeds a selected minimum ratio.

10. The system as recited in claim 1 wherein the set of heuristic tests includes accepting partition areas in the flood-filled image that are clustered together and have substantially equal aspect ratios containing about a same number of pixels.

11. A MacBeth color checker chart automatic detection method, comprising:
    applying an edge detection operation to an image using one or more computer processors;
    performing a flood-fill operation on the image using the one or more computer processors to provide a flood-filled image; and
    testing the flood-filled image using the one or more computer processors to provide a modified flood-fill image, wherein a set of heuristic tests are employed to automatically determine quantity and location of MacBeth color checker charts.

12. The method as recited in claim 11 wherein the edge detection operation individually identifies edges in each of the red, green and blue color planes of the image.

13. The method as recited in claim 12 wherein a resulting edge-detected image corresponds to a spatial set of separate partition areas having no colored pixels.

14. The method as recited in claim 11 wherein the flood-fill operation fills partition areas that are surrounded by edges of colored pixels.

15. The method as recited in claim 11 wherein the set of heuristic tests includes accepting a partition area in the flood-filled image that exceeds a minimum number of pixels.

16. The method as recited in claim 11 wherein the set of heuristic tests includes accepting a partition area in the flood-filled image having a bounding shape with a length to width ratio that is less than a maximum value.

17. The method as recited in claim 11 wherein the set of heuristic tests includes accepting a partition area in the flood-filled image if a color of a selected number pixels therein is determined to be consistent with a reference color.

18. The method as recited in claim 17 wherein the reference color corresponds to the colors of the MacBeth color chart.

19. The method as recited in claim 11 wherein the set of heuristic tests includes accepting a partition area in the flood-filled image having a ratio of its partition area to the number of pixels contained therein that exceeds a selected minimum ratio.

20. The method as recited in claim 11 wherein the set of heuristic tests includes accepting partition areas in the flood-filled image that are clustered together and have substantially equal aspect ratios containing about a same number of pixels.

\* \* \* \* \*